J. HAEGE.
Beer Preserver.
No. 45,994. Patented Jan. 24, 1865.
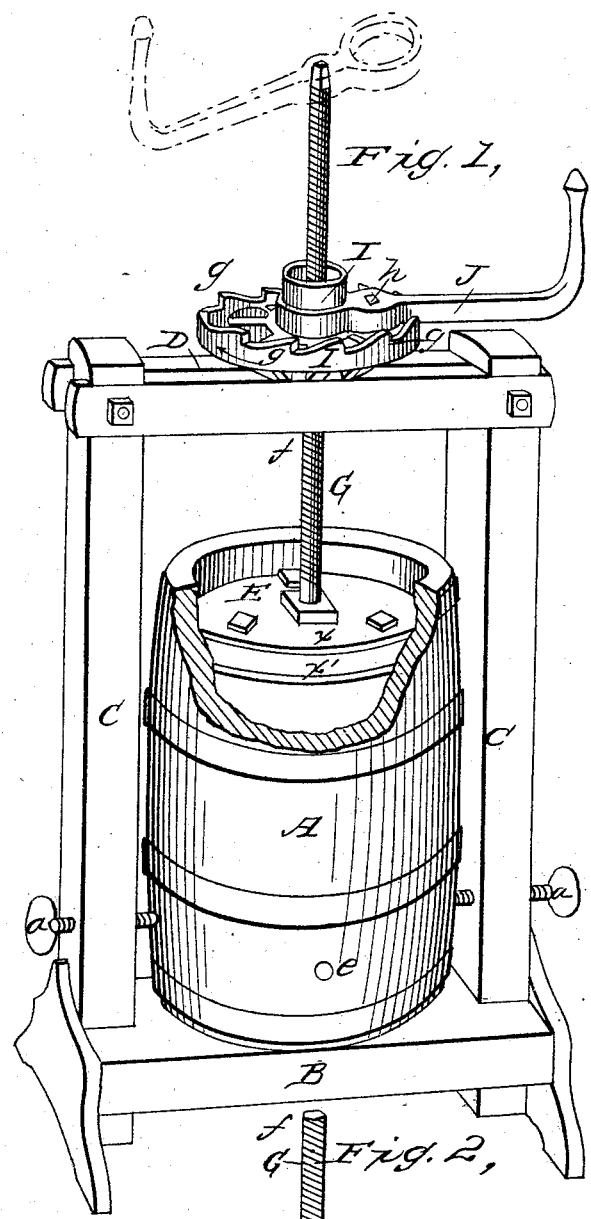
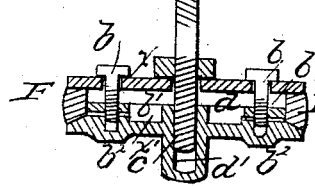

UNITED STATES PATENT OFFICE.

JACOB HAEGE, OF SHILOH, ILLINOIS.

IMPROVED CASK FOR PRESERVING BEER, &c.

Specification forming part of Letters Patent No. 45,994, dated January 24, 1865.

*To all whom it may concern:*

Be it known that I, JACOB HAEGE, of Shiloh, in the county of St. Clair and State of Illinois, have invented a new and useful Improvement in Beer-Preservers; and I do hereby declare that the following is a full, clear, and exact description thereof, which will enable those skilled in the art to make and use the same, reference being had to the accompanying drawings, forming a part of this specification, in which—

Figure 1 is a perspective view of my improvement in part sectional. Fig. 2 is a side sectional elevation of the piston.

Similar letters of reference indicate corresponding parts.

The object of this invention is to preserve beer, wines, and all kinds of juices and liquids in a fresh state by preventing the contact of air with the said substances. This I accomplish in the following manner:

A is the vessel in which the beer or other liquid or substance to be preserved is placed. This vessel may be made in the form of a barrel, as shown, or in any other form. It may also be composed of wood, glass, metal, or any combination thereof, or of any other suitable material or materials. I do not limit myself to any particular form or material.

The lower part of the vessel rests upon a suitable block or platform, B, from which rise two side pieces, C C, having cross-bars D above. The vessel A is held in proper place under the bars D by means of two screw-clamps, $a$ $a$, which pass through the side bars, C C, and press against the vessel, as shown. By means of the screws $a$ $a$ the barrel may be adjusted and held in the exact position desired.

The vessel A having been filled with beer or other liquid, the upper end of the vessel is closed by the introduction therein of the head or piston E, which is intended to fit airtight into the vessel A, the under surface of the piston being in contact with the upper surface of the liquid. The piston E is composed of two separate plates, $x$ $x'$, which compress between their edges a ring of elastic packing, F, which constitutes the periphery of the piston E. The plates $x$ $x'$ are held together and prevented from lateral movement by means of screw-bolts $b$ $b$ $b$, which pass loosely through the upper plate, $x$, but screw into nuts $b'$ in the lower plate, $x'$. The primary fastening together of the plates $x$ $x'$ is effected by tightening the bolts $b$. The nuts $b'$ are contained in pockets or cavities $b'$, made in the plate $x'$ for that purpose, as shown.

The plates, having been primarily set and combined by the bolts $b$, may be further compressed or made to approach or recede from each other by means of the left-hand screw-thread $c$ upon the lower end of the piston-rod G. The said screw-thread moves through a screw-nut, $d$, in the lower plate $x'$, said nut being contained in a cavity, $d$, which is cast with and projects from the under surface of said plate $a'$, as shown. The cavities $b^2$ $d'$ and packing F prevent the contents of the vessel A from entering between plates $x$ $x'$. When the screw $c$ is screwed down into the nut $d$, the plates $x$ $x'$ will be brought toward each other, and will compress the packing F, causing it to project beyond the edges of the plates $a$ $a'$, thus making the piston to fit more tightly within the vessel A. The packing may be relaxed or compressed at pleasure by turning the piston-rod G. This turning is accomplished by means of a crank, H, applied to the top of the piston-rod, as shown in red.

At $e$ upon the vessel A there is to be a tap or other device for the purpose of drawing off the contents of the vessel, and as fast as drawn off the piston is to be moved down upon the liquid, so as to exclude the air therefrom. For the purpose of effecting this movement the piston-rod G is provided with a common screw-thread, $f$, and upon the cross-bar D, I arrange a hand-nut, I, which, when turned in the direction of the arrow, causes the descent of the piston E, and when the nut I is turned in the contrary direction the piston E will rise.

In order to facilitate the turning of the nut I to cause the descent of the piston-rod, I provide the edge of the nut I with a series of ratchet-teeth, $g$, in connection with which I use a lever, J, the inner end of which is provided with a ring to fit loosely over the central part of the nut, forming a fulcrum, while the lever is pressed against the ratchet-teeth in the direction of the arrow in the manner shown. The lever J has a small orifice in its body at $h$, which fits the upper end of the piston-rod G when the latter is to be turned, as indicated in red.

By the movement of the nut I the piston E may be raised or lowered at pleasure, and thus made to closely cover the contents of the vessel A and exclude the air therefrom in the manner before described.

If desired, this device may be used to produce a pressure upon the surface of the liquid by simply moving down the piston so as to force or drive out the liquid through the orifice $e$ or other suitable orifice, a hose-pipe or other conductor being applied to said orifice. The device may also be employed to produce a suction by raising the piston, and by such suction the vessel A may be filled and the contents of another vessel drawn off, a hose-pipe being extended from the orifice $e$ to the vessel to be emptied or drawn off. The vessel A and piston may be also employed as a wine or cider press, if desired, and for compressing various substances.

Having thus described my invention, I claim as new and desire to secure by Letters Patent—

1. The combination of the piston-rod G and its screw $c$ with the plates $x$ $x'$ and packing F, substantially in the manner herein shown and described, so that by revolving the said piston-rod the periphery of the piston will be expanded or contracted, all as specified.

2. The employment of the ratchet-nut I, in combination with the screw piston-rod G and piston E, substantially as herein shown and described.

3. The construction of the plate $x'$ with cavities to receive the screws, substantially as and for the purpose herein shown and described.

JACOB HAEGE.

Witnesses:
 CHRIST TREFZER,
 GEORG HORBART.